(No Model.)

A. HAY.
SACK FILLER.

No. 282,984. Patented Aug. 14, 1883.

Witnesses.
Saml R. Turner
P. B. Turpin

Inventor
Alexander Hay
By R. S. & A. P. Lacey
Att'ys

UNITED STATES PATENT OFFICE.

ALEXANDER HAY, OF COSHOCTON, OHIO.

SACK-FILLER.

SPECIFICATION forming part of Letters Patent No. 282,984, dated August 14, 1883.

Application filed June 12, 1883. (No model.)

*To all whom it may concern:*

Be it known that I, ALEXANDER HAY, a citizen of the United States, residing at Coshocton, in the county of Coshocton and State of Ohio, have invented certain new and useful Improvements in Sack-Fillers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improved devices to facilitate the filling and tying of articles in bags, and is especially intended for grocers' use.

It consists in the peculiar construction, combination, and arrangement of the several parts, as will be hereinafter described and claimed.

Figure 1:
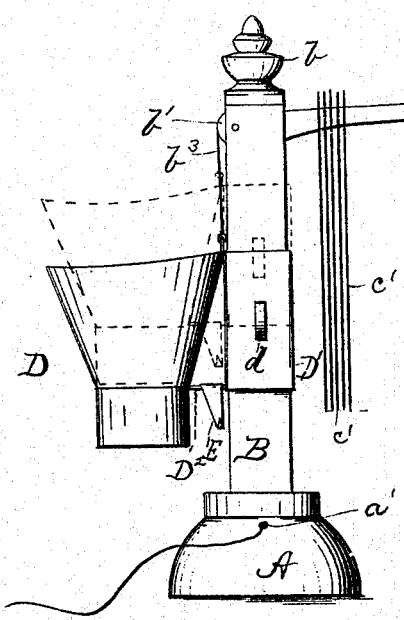
Figure 2:
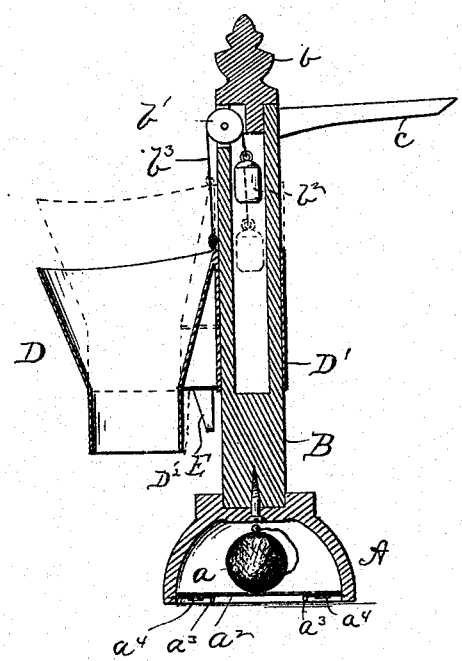
Figure 3:
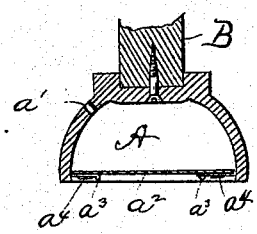
Figures 4, 5:
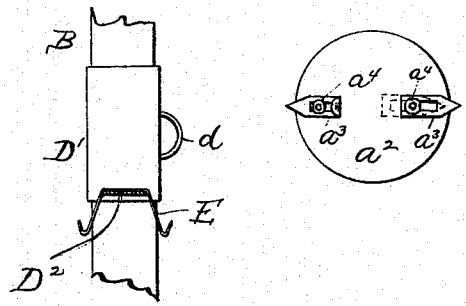

In the drawings, Figure 1 is a side view, and Fig. 2 is a vertical section, of a device constructed according to my invention. Fig. 3 is a detached sectional view of the twine-box base. Fig. 4 shows the removable bottom of the twine-box; and Fig. 5 is a detached sectional view, illustrating the bag-holding hooks.

The base A is made hollow to receive the twine-ball $a$, and it has an opening, $a'$, leading from it, which serves as an exit for the twine as the same is used. The bottom of this base is closed by the plate $a^2$, fitted thereto, and held in place by the latches $a^3$, which are held to the plate by screws $a^4$, passed through slots in the said latches, so the latter may be moved to clamp the plate in position, as shown in Figs. 2 and 3, or be removed for the purpose of renewing the twine, or for any other desired purpose.

The standard B is mounted on the base A, and is made hollow at its upper end, and provided preferably with a removable cap, $b$. In the front wall of the standard, at or near its top, I journal the guide-pulley $b'$, and a weight, $b^2$, is placed within the standard, and is connected by cord $b^3$, which passes over the guide-pulley $b'$, with the funnel in the operation of the device, so as to balance the weight of said funnel. A bar, $c$, has one end secured to the standard near the top of the latter, and extends laterally therefrom, with its outer end sharpened, as shown, and the bags, $c'$, to be used are forced on and held by this bar, as shown in Fig. 1.

The funnel D is made in the usual flaring shape, and is connected at its upper end directly to the sleeve D', and near its lower end it is connected with the said sleeve by means of the plate $D^2$. The sleeve D' is placed on the standard B, and may be moved up or down thereon, being provided with a handle, $d$, whereby the sleeve, and with it the scoop, may be readily moved up or down, as desired. Hooks E are secured to and depend from the opposite side of the plate or bar $D^2$, with their lower ends or hooks proper turned outward, as shown in Fig. 5.

In the operation of my invention, when the several parts thereof are in the position shown in Fig. 1, and it is desired to tie up some article, a bag is removed from the supporting-bar and slipped up over the lower end of the funnel and caught on the hooks E, and the article is delivered into the funnel and passes thence into the bag. The funnel is moved up, as indicated in dotted lines, Fig. 1, the hooks tearing loose from the bag when the latter may be tied by the cord from the twine-box.

The several parts of my device are conveniently arranged, and facilitate the filling and tying of the bags, as well as providing means for holding the bags to be used in convenient reach of the operator.

Having thus described my invention, what I claim, and desire to secure by Letters Patent, is—

1. In a bag-holder, the combination of a standard provided with a guide-pulley, a funnel sliding on the standard, and having hooks secured thereto, a counterbalancing-weight, and a cord connecting the funnel and the weight and passing over the guide-pulley, substantially as set forth.

2. The combination of a hollow base adapted to hold a ball of cord, and having a suitable cord-exit, a hollow standard mounted on the said base, a guide-pulley journaled in the upper end of said standard, a funnel, a counterbalancing-weight, and a suitable cord connecting the funnel and the weight, all substantially as and for the purpose set forth.

3. The bag-holder consisting of a twine-box base, a standard mounted thereon, a funnel sliding on the standard, and having bag-holding hooks connected therewith, a counterbalancing-weight, and a pointed bar extended laterally from the standard, and adapted to hold the bags, all as and for the purpose set forth.

In testimony whereof I affix my signature in presence of two witnesses.

ALEXANDER HAY.

Witnesses:
SAMUEL GAMBLE,
C. A. LAMBERSON.